United States Patent
Link

(10) Patent No.: US 6,254,131 B1
(45) Date of Patent: Jul. 3, 2001

(54) MOTOR VEHICLE STEERING COLUMN ARRANGEMENT WITH SPACE-SAVING HOLDER FOR ADJUSTMENT

(75) Inventor: Manfred Link, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/272,374

(22) Filed: Mar. 19, 1999

(30) Foreign Application Priority Data

Mar. 19, 1998 (DE) .............................. 198 12 172

(51) Int. Cl.$^7$ ...................................... B62D 1/99
(52) U.S. Cl. .................. 280/779; 280/755; 280/777; 74/492; 74/493
(58) Field of Search .................. 280/775, 777, 280/779; 74/492, 493

(56) References Cited

U.S. PATENT DOCUMENTS

| | | | |
|---|---|---|---|
| 3,768,845 | 10/1973 | Gilliland | 287/53 H |
| 3,799,569 | * 3/1974 | Baker | 280/775 |
| 5,070,741 | * 12/1991 | Ervin | 74/492 |
| 5,071,163 | * 12/1991 | Heinrichs et al. | 280/775 |
| 5,199,319 | * 4/1993 | Fujiu | 74/493 |
| 5,226,853 | * 7/1993 | Courgeon | 280/775 |
| 5,235,734 | * 8/1993 | DuRocher et al. | 29/455.1 |
| 5,314,204 | * 5/1994 | DuRocher et al. | 280/777 |
| 5,332,260 | * 7/1994 | Heinrichs et al. | 280/775 |
| 5,439,252 | * 8/1995 | Oxley et al. | 280/775 |
| 5,482,320 | * 1/1996 | Passebecq | 280/777 |
| 5,678,454 | * 10/1997 | Cartwright et al. | 74/493 |
| 5,722,300 | * 3/1998 | Burkhard et al. | 74/493 |
| 5,870,930 | * 2/1999 | Willett et al. | 74/492 |
| 5,911,789 | * 6/1999 | Keipert et al. | 74/493 |

FOREIGN PATENT DOCUMENTS

| | | |
|---|---|---|
| 195 24 196 | 11/1996 | (DE) . |
| 195 24 196 C1 | 11/1996 | (DE) . |
| 0 152 311 | 8/1985 | (EP) . |
| 0 502 296 | 9/1992 | (EP) . |
| 0 634 313 | 1/1995 | (EP) . |
| 2 594 504 | 8/1987 | (FR) . |

* cited by examiner

*Primary Examiner*—Eric Culbreth
*Assistant Examiner*—L. Lum
(74) *Attorney, Agent, or Firm*—Crowell & Moring, L.L.P.

(57) ABSTRACT

A steering column arrangement has an adjusting spindle of a spindle drive for the axial adjustment of the interior steering column tube relative to the exterior steering column tube which is fixed by a holder on the interior steering column tube. The holder is a ring-shaped collar which, by way of a ring arrangement positioned between the outer jacket of the interior steering column tube and the inner circumference of the collar, is axially form-lockingly and frictionally engaged in the circumferential direction fixed on the interior steering column tube.

9 Claims, 1 Drawing Sheet

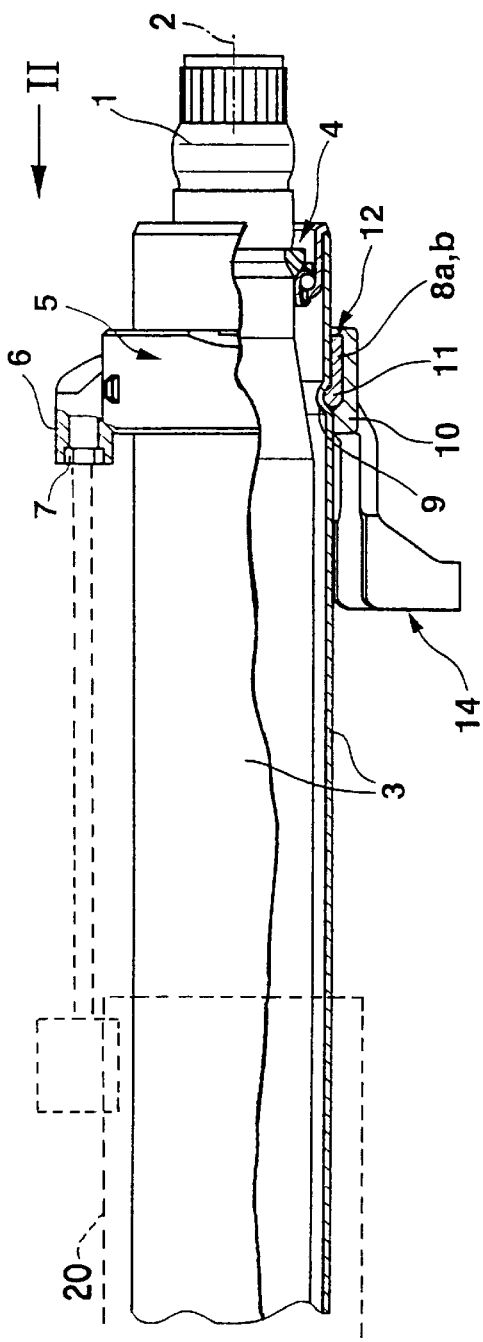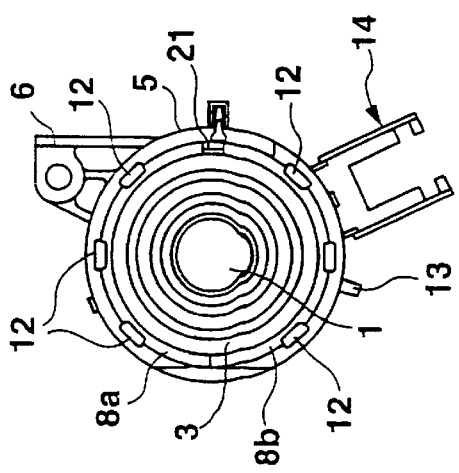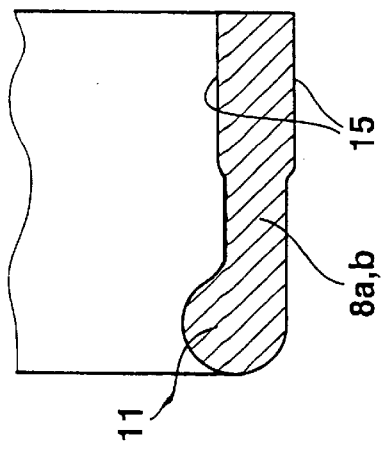

MOTOR VEHICLE STEERING COLUMN ARRANGEMENT WITH SPACE-SAVING HOLDER FOR ADJUSTMENT

This application is related to application Ser. No. 09/272375 filed on Mar. 19, 1999, entitled STEERING COLUMN ARRANGEMENT FOR A MOTOR VEHICLE, and filed in the name of Manfred Link.

BACKGROUND OF THE INVENTION

This application claims the priority of 198 12 172.5-21, filed Mar. 19, 1999, the disclosure of which is expressly incorporated by reference herein.

The present invention relates to a steering column arrangement for a motor vehicle, having an interior steering column tube, which is telescopically displaceably arranged by an adjusting arrangement inside an exterior, stationarily arranged steering column tube. The adjusting arrangement has a longitudinally extending adjusting member which extends axially in parallel to the interior steering column tube and is stationarily applied to the interior steering column tube by way of a front end via a holder fixed on the outer jacket of the interior steering column tube.

A steering column arrangement is described in DE 195 24 196 C1. The known steering column arrangement has an interior steering column tube which is telescopically displaceably disposed in an exterior steering column tube stationarily fixed in the motor vehicle. In order to permit an automatic adjustment of the interior steering column tube relative to the exterior steering column tube, a spindle drive is provided which is acted upon by an electric servo motor. The spindle drive has a threaded spindle which extends on the outside along the exterior steering column tube and is stationarily fixed by a front end on a holder fixed on an outer jacket of the interior steering column tube. The threaded spindle engages in a threaded nut which is rotatably disposed on the exterior steering column tube. The threaded nut has an exterior toothing so that it meshes with a gearbox which is driven by the electric servo motor. A rotation of the threaded nut by the servo motor therefore causes an axial displacement of the threaded spindle and thus, because of the force transmission by way of the holder, also an axial displacement of the interior steering column tube. The fixing of the holder on the outer jacket of the interior steering column tube is not described in detail.

SUMMARY OF THE INVENTION

An object of the present invention is to provide a steering column arrangement which permits a space-saving and secure fixing of the adjusting member on the interior steering column tube.

This object has been achieved by configuring the holder as a ring-shaped collar which, by way of a ring arrangement positioned between the outer jacket of the interior steering column tube and the interior circumference of the collar, is axially form-lockingly and frictionally in the circumferential direction fixed on the interior steering column tube. The ring arrangement between the collar and the outer jacket of the steering column tube can be constructed in one or several pieces. It may be molded in one piece to the outer jacket of the interior steering column tube or may be placed onto the outer jacket.

The solution according to the present invention permits an extremely space-saving fixing of the holder for the adjusting member, in which no fastening elements project radially to the outside. On the contrary, the fixing takes place within the collar so that the fixing devices in the form of the ring arrangement are covered by the collar. The fastening of the collar, which is axially form-locking and frictional in the circumferential direction permits, a secure transmission of the occurring forces, despite the space-saving construction. The fastening according to the present invention has such a stable construction that, even in the event of a vehicle impact, no displacement of the collar takes place on the steering column tube as the result of correspondingly introduced impact forces. The frictional fixing in the circumferential direction has the purpose of absorbing operating forces of a switch module occurring in the circumferential direction. The switch module contains a shift lever having turn signal and cruise control functions as well as other functions. The switch module can be pushed onto the interior steering column tube from the steering wheel side and at least partially reaches over the collar. A form-closure is achieved between the collar and the switch module in the circumferential direction. In addition to the axial securing of the collar on the interior steering column tube also against impact loads, the collar is therefore also used as a support for the switch module in the circumferential direction.

BRIEF DESCRIPTION OF THE DRAWINGS

Other objects, advantages and novel features of the present invention will become apparent from the following detailed description of the invention when considered in conjunction with the accompanying drawings.

FIG. 1 is a partial view of an interior steering column tube holding a steering spindle of an embodiment of a steering column arrangement according to the present invention;

FIG. 2 is a front-side view of the steering column tube in the direction of arrow II in FIG. 1;

FIG. 3 is an enlarged view of a cutout of the steering column tube shown in FIG. 1 at the level of the fastening of a collar for holding an adjusting member; and FIG. 4 is another enlarged view of a portion of a ring arrangement for fastening the collar according to FIG. 3 on the steering column tube according to FIGS. 1 and 3.

DETAILED DESCRIPTION OF THE DRAWINGS

With respect to its basic construction, a steering column arrangement for a passenger car corresponds to the arrangement described in the above-referenced DE 195 24 196 C1 patent document. According to FIGS. 1 to 3, the steering column arrangement has a steering spindle 1 which is rotatable about steering axis 2 disposed in an interior steering column tube 3 by corresponding bearings designated generally by numeral 4. A steering wheel can be placed on the front end of the steering spindle 1 illustrated in FIG. 1, so that this front end has the portion of the steering spindle 1 projecting into the interior of the passenger car. As generally known from the DE 195 24 196 C1 document, the interior steering column tube 3 is axially displaceably disposed in an exterior steering column tube 20.

In order to cause the telescopic axial displacement of the interior steering column tube 3 relative to the exterior steering column tube 20, the steering column arrangement has a spindle drive, as basically also known from DE 195 24 196 C1. The spindle drive has an adjusting spindle which is constructed as a threaded spindle at least in a partial area and which, by way of a threaded nut rotatably disposed on the exterior steering column tube, a corresponding gearbox and an electric servo motor, is linearly movably arranged axially in parallel to the steering axis 2.

A front end of the adjusting spindle assigned to the interior steering column tube 3 engages, by way of a corresponding square profile, non-rotatably in a corresponding square receiving profiling 7 of a holding device 6 which is fixed as a one-piece portion of a ring-shaped collar 5 on the outer jacket of the interior steering column tube 3. The collar 5 transmits corresponding tension and compression movements of the adjusting spindle to the interior steering column tube 3 so that the desired axial displacements are achieved. In the illustrated embodiment, the collar 5, including the holding device 6, is a light-metal cast part. In a manner described in greater detail below, the ring-shaped collar 5 reaches around the interior steering column tube 3 in a surrounding manner coaxially with respect to the steering axis 2. A plug-receiving device 14, in which a plug-type coupling of a switch module can be positioned, is molded in one piece to the collar 5, whereby a corresponding plug can be fitted into this plug-type coupling. The plug-type connection ensures an electronic or electric data and signal transmission.

For the fastening of the collar 5 on the outer jacket of the interior steering column tube 3, a ring arrangement is provided which is formed by two identical half shells 8a, 8b. The two half shells 8a, 8b shown in FIGS. 3 and 4, have a circular-segment-shaped profiled ring edge 11 as a radial cross-section, which projects radially toward the inside from each half shell 8a, 8b. As a corresponding outer contour, a bead 9 is assigned to this ring edge 11 in the steering column tube 3. The ring edge 11 of each half shell 8a, 8b is embedded in the bead 9 in an axially form-locking manner. In addition, as seen in FIG. 4, both half shells have, a thickened section 15, in the area of their edge section situated opposite the ring edge 11. As the result, a outer contour as well as the inner contour of each half shell 8a, 8b has a radially stepped configuration. The ring arrangement has a radially flexible configuration which is arranged to be axially form-lockingly fixed on the outer diameter of the steering column tube. The ring arrangement is radially flexibly divided by at least one slot 21 which is axially in parallel to the steering column tube as shown in FIG. 2.

The collar 5 has an inside diameter which is larger than the outside diameter of the outer jacket of the interior steering column tube 3. The collar 5 is pushed onto the steering column tube 3 from a side situated opposite the projecting front end of the steering spindle 1 and is pressed axially onto the two half shells 8a, 8b already positioned on the bead 9. The thickened sections 15 of the two half shells 8a, 8b increase the frictional engagement of the press fit. The collar 5 is pressed so far axially that a ring shoulder 10 of the collar 5 comes to rest axially against the ring edge 11 of each half shell 8a, 8b. The ring shoulder 10 extends radially to the inside and has an inside diameter slightly larger than the outside diameter of the interior steering column tube 3.

In the pressing direction, the ring shoulder 10 of the collar 5 therefore rests axially form-lockingly against the ring edge 11 of each half shell 8a, 8b. In order to achieve a form closure also in the opposite axial direction, in addition to the frictional engagement achieved by the press fit, the front edge of the collar 5 protruding in this area is caulked by a total of six to ten caulking noses 12, which are distributed over the circumference of the collar 5, with the two half shells 8a, 8b. Depending on the respective embodiment, the caulkings have minimum press-out forces of >15 kN.

The frictional engagement achieved with the thickened sections 15 of the two half shells 8a, 8b also causes a secure hold of the collar 5 on the steering column tube 3 in the circumferential direction. This frictional engagement in the circumferential direction, which is also achieved by the additional contact surfaces between the half shells 8a, 8b and the inner circumference of the collar 5 and the outer jacket of the steering column tube 3, including the bead 9, permits a secure support of operating forces of a switch module occurring in the circumferential direction.

The switch module is fitted from the side of the steering wheel onto the interior steering column tube 3 and reaches in a form-locking manner in the circumferential direction over a driving pin 13 on the collar 5. The switch module has a radially protruding shift lever which is configured as a combination switch and, in addition to a turn signal function, can also activate cruise control or light functions.

A corresponding operation of this shift lever, however, results in circumferential forces which may cause a torsion of the switch module on the steering column tube 3. The fastening of the collar 5, which is secure in the circumferential direction, and the support by the driving web molded on in one piece permit a handling of the switch module which avoids problems and is torsionally secure with respect to rotation. The axially form-locking fastening of the collar 5 on the steering column tube 3 has such a stable construction that also axial forces caused by vehicle impact loads do not cause a displacement of the collar 5 on the steering column tube 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering column arrangement for a motor vehicle, having an interior steering column tube configured to be telescopically displaceably arranged via an adjusting arrangement inside a stationary exterior steering column tube, the adjusting arrangement comprising a longitudinally extending adjusting member which extends parallel to the interior steering column tube and has a front end stationarily applied to the interior steering column tube by way of a holder fixed on an outer circumference of the interior steering column tube, wherein the holder comprises a ring-shaped collar which, together with a ring arrangement positioned between the outer circumference of the interior steering column tube and an interior circumference of the collar, is axially form-lockingly and frictionally fixed on the interior steering column tube.

2. The steering column arrangement according to claim 1, wherein the ring arrangement has a radially flexible configuration and is arranged to be axially form-lockingly fixed on the outer circumference of the interior steering column tube.

3. The steering column arrangement according to claim 2, wherein the ring arrangement is divided into two half shells which are provided with one radial inner contour, respectively, which extend in a circumferential direction and which engage form-lockingly in a corresponding outer contour of the interior steering column tube.

4. The steering column arrangement according to claim 3, wherein the ring arrangement is radially flexibly divided by at least one slot which is in parallel to the interior steering column tube.

5. The steering column arrangement according to claim 3, wherein the half shells are provided with at least one thickened section configured to increase frictional engagement between the interior steering column tube and the collar.

6. The steering column arrangement according to claim 1, wherein the ring arrangement is radially flexibly divided by at least one slot which is axially in parallel to the interior steering column tube.

7. The steering column arrangement according to claim 6, wherein the ring arrangement has a radially flexible configuration and is arranged to be axially form-lockingly fixed on the outer circumference of the interior steering column tube.

8. The steering column arrangement according to claim 1, wherein the collar is provided with a ring shoulder for axial securing of the collar on the ring arrangement.

9. The steering column arrangement according to claim 8, wherein caulking is provided at the collar and the ring arrangement.

* * * * *